(12) United States Patent
Maeda et al.

(10) Patent No.: US 7,616,670 B2
(45) Date of Patent: Nov. 10, 2009

(54) LASER LIGHT SOURCE APPARATUS AND IMAGE GENERATING APPARATUS USING LASER LIGHT SOURCE APPARATUS

(75) Inventors: Yuki Maeda, Tokyo (JP); Michio Oka, Tokyo (JP); Kaoru Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 11/973,564

(22) Filed: Oct. 9, 2007

(65) Prior Publication Data
US 2008/0137697 A1 Jun. 12, 2008

(30) Foreign Application Priority Data
Oct. 30, 2006 (JP) .............................. 2006-294587

(51) Int. Cl.
*H01S 3/10* (2006.01)
(52) U.S. Cl. ........................................ 372/22; 372/21
(58) Field of Classification Search ................... 372/21, 372/22
See application file for complete search history.

(56) References Cited

U.S. PATENT DOCUMENTS 5,130,997 A * 7/1992 Ortiz et al. ..................... 372/21
2008/0259431 A1* 10/2008 Weichmann et al. ......... 359/237

FOREIGN PATENT DOCUMENTS

| JP | 2006-66818 | 3/2006 |
| JP | 2006-066818 | 3/2006 |

* cited by examiner

*Primary Examiner*—Dung T Nguyen
(74) *Attorney, Agent, or Firm*—Robert J. Depke; Rockey, Depke & Lyons, LLC

(57) ABSTRACT

Disclosed is a laser light source apparatus including an excitation light source, a pair of resonator mirrors, and a resonator including the excitation light source and the pair of resonator mirrors. In the laser light source apparatus, one of two higher harmonic waves generated from the wavelength conversion element is output to the outside of the resonator, is returned to the wavelength conversion element by the retroreflection unit, the higher harmonic wave returned by the retroreflection unit is spatially displaced, is superposed on the other higher harmonic wave generated from the wavelength conversion element, and is output to the outside.

7 Claims, 14 Drawing Sheets x y z x+y x+z y+z x+y+z

LASER LIGHT SOURCE APPARATUS AND IMAGE GENERATING APPARATUS USING LASER LIGHT SOURCE APPARATUS

CROSS REFERENCES TO RELATED APPLICATIONS

The present invention contains subject matter related to Japanese Patent Application JP 2006-294587 filed in the Japanese Patent Office on Oct. 30, 2006, the entire contents of which being incorporated herein by reference.

BACKGROUND OF THE INVENTION

1. Field of the Invention

The present invention relates to a laser light source apparatus having a laser medium and a wavelength conversion element in a resonator or generally called an internal resonator type laser light source apparatus, and an image generating apparatus using the laser light source.

2. Description of the Related Art

It has been preferable that various light source apparatus using laser light sources, such as projectors and laser printers, be small in size and have stable laser light source with small power consumption. In particular, Japanese Unexamined Patent Application Publication No. 2006-66818 discloses a light source apparatus having a retroreflection mirror located within a resonator as an example of a laser light source apparatus having a resonator structure that utilizes a wavelength conversion element such as a nonlinear optical crystal and having a function to convert a fundamental wave into a higher harmonic wave to reduce the size of the light source apparatus while maintaining a predetermined resonator length.

SUMMARY OF THE INVENTION

Higher harmonic waves generated from a wavelength conversion element are emitted in two directions along a light path of a fundamental wave introduced into the wavelength conversion element. One higher harmonic wave is emitted in the light emission direction of the laser light source apparatus while the other higher harmonic wave is reflected by a reflection mirror provided at the outside of a resonator. In this manner, two higher harmonic waves are superposed and output in the light emission direction of the apparatus, thereby efficiently outputting the higher harmonic waves. The enhanced efficiency of the higher harmonic waves will cause the laser light source apparatus to output more intensive light while capable of reducing the size of the laser light source apparatus.

However, in this case, higher harmonic waves are unstably output due to interference between a higher harmonic wave reflected and returned with the retroreflection mirror and a higher harmonic wave generated in the original light emission direction.

While interference can be reduced to some extent by allowing a distance between the wavelength conversion element and the retroreflection mirror to be longer than a time coherence length, a distance between the wavelength conversion element and the reflection mirror will increase if the time coherence length is sufficiently long. As a result, the apparatus may not exhibit sufficient high output stability.

Since it is desirable that a beam diameter of laser beam be decreased in the wavelength conversion element in order to enhance wavelength conversion efficiency, if a reflection mirror is provided with a long distance as described above, then a large-sized reflection mirror may be required.

When a retroreflection mirror is applied to a lateral multi-mode laser light source apparatus which outputs linear light as is described in the Patent Document 1, a retroreflection mirror of a large size becomes necessary in the major axis direction of a beam and a problem arises, in which it becomes difficult to miniaturize a laser light source apparatus.

In view of the aforementioned embodiments, it is desirable to provide a laser light source apparatus in which an output and a beam profile can be stabilized by suppressing interference of higher harmonic waves when the apparatus outputs a higher harmonic wave based on wavelength conversion and an image generating apparatus using this laser light source apparatus.

According to an embodiment of the present invention, there is provided a laser light source apparatus including an excitation light source, a pair of resonator mirrors, a resonator including the excitation light source and the pair of resonator mirrors, a laser medium, a wavelength conversion element, the laser medium and the wavelength conversion element being provided with the resonator and a retroreflection unit. In this embodiment, one higher harmonic wave of two higher harmonic waves generated from the wavelength conversion element is output to the outside of the resonator, is returned to the wavelength conversion element by the retroreflection unit, the higher harmonic wave returned by the retroreflection unit is spatially displaced, and superposed on the other higher harmonic wave generated from the wavelength conversion element and output to the outside.

As described above, when one higher harmonic wave is reflected by the retroreflection unit and returned to the wavelength conversion element, the higher harmonic wave is spatially displaced and superposed on the other higher harmonic wave; that is, the retroreflection unit is provided for spatial coherence. In this manner, when spatial coherence is decreased, coherence can be reliably decreased with a relatively small amount of displacement as will be described later. Accordingly, it is possible to output higher harmonic waves with stable high output and stable beam profile with a relatively small size of the apparatus.

Further, in the above-mentioned laser light source apparatus according to an embodiment of the present invention, the higher harmonic wave retroreflection unit located at the outside of the resonator includes a concave mirror of which radius of curvature is larger than $\frac{1}{2}$ of a time coherence length of a higher harmonic wave.

In this manner, since the concave mirror with the radius of curvature larger than $\frac{1}{2}$ of the time coherence length of a higher harmonic wave is provided as the retroreflection unit, an optical path length from the wavelength conversion element to the concave mirror can be longer than the time coherence length. When the concave mirror is displaced so as to rotate or to translate, it is possible to obtain a mechanism for returning a higher harmonic wave with a desired spatial amount of displacement to the wavelength conversion element with a relatively small amount of displacement.

Further, an image generating apparatus according to an embodiment of the present invention includes a laser light source apparatus, an optical modulating unit for modulating light emitted from this laser light source apparatus in response to information and a projection optical unit. In this embodiment, the laser light source apparatus having the above-mentioned embodiment is used as the laser light source apparatus.

According to the image generating apparatus of an embodiment of the present invention, when the laser light source apparatus is used, it is possible to generate images by using stable and intensive higher harmonic wave light.

Further, according to the laser light source apparatus of the present invention, it is possible to stabilize an output and a beam profile by suppressing spatial coherence of a higher harmonic wave.

According to the image generating apparatus of an embodiment of the present invention, it is possible to generate images by using a higher harmonic wave of stable output in which spatial coherence is decreased.

DESCRIPTION OF THE PREFERRED EMBODIMENTS

Embodiments of the present invention will be described below but it is needless to say that the present invention may not be limited to the embodiments which will follow.

Figure 1:
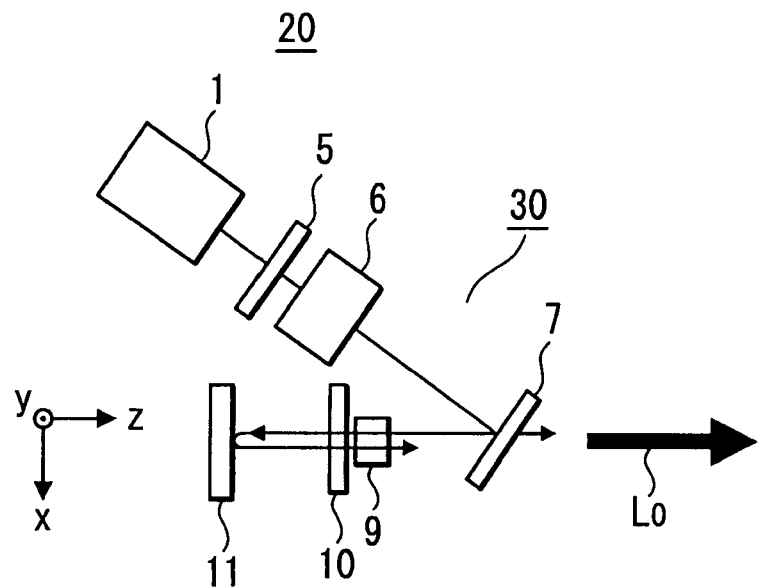
FIG. 1 is a schematic plan view of one example of a laser light source apparatus according to an embodiment of the present invention.

FIG. 1 is a schematic plan view of one example of a laser light source apparatus according to an embodiment of the present invention. The laser light source apparatus 20 according to this embodiment includes an excitation light source 1; and one resonator mirror 5 forming a resonator 30, a laser medium 6 and a reflection unit 7 formed of a suitable device such as a concave mirror which are located in a light path of light emitted from the excitation light source 1. Further, the laser light source apparatus 20 further includes a wavelength conversion element 9 including elements such as a nonlinear optical element and the other resonator mirror 10 forming the resonator 30 that are located in a light path of light reflected by the reflection unit 7. The laser light source apparatus 20 according to an embodiment of the present invention still further includes a retro-reflection unit 11 for reflecting one of the higher harmonic waves generated from the wavelength conversion element 9 that is located at the opposite side of the resonator mirror 10.

As an example of the excitation light source 1, a semiconductor laser or a discharge lamp may be given; however, a semiconductor laser may be preferable, in a case where the excitation light source 1 may need be reduced in size and elongate longevity of the light source. When a semiconductor laser is employed, the entire excitation light source 1 can be formed as a solid-state laser light source. Further, a laser light source such as a one-dimensional laser array in which semiconductor lasers, for example, are arrayed in a one-dimensional fashion can be used the excitation light source 1. In this case, the laser light source outputs elliptic laser light by which the laser medium 6 is excited in the lateral multimode to generate a linear fundamental wave beam.

Solid laser materials with rare earth elements added thereto may be used as the laser medium 6. An example of the solid laser materials used as the laser medium 6 includes yttrium aluminum garnet ($Y_3Al_5O_{12}$) doped with Nd ions such as Nd:YAG, Nd:YVO$_4$, Nd:GdVO$_4$, and Yb:YAG.

A nonlinear optical crystal or nonlinear optical element that forms the wavelength conversion element 9 may be used in wavelength conversion such as SHG (second harmonic generation) and THG (third harmonic generation). Alternatively, the onlinear optical crystal or nonlinear optical element may also be used in sum-frequency generation and optical parametric generation. Examples of the materials used for the nonlinear optical crystal or nonlinear optical element include nonlinear optical materials such as KTiOPO$_4$ (KTP), β-BaB$_2$O$_4$ (BBO), LiB$_3$O$_5$ (LBO), MgO:LiNbO$_3$ or PP-KTiOPO$_4$, PP-MgO:LiNbO$_3$, PP-MgO:LiTaO$_3$, PP-MgO:S-LiNbO$_3$, and PP-S-LiTaO$_3$. It should be noted that "PP" represents "Periodical Poling (periodically-poled structure)" and that "S" represents "stoichiometric (stoichiometric composition)". A nonlinear optical element having a periodically-poled structure can be obtained based on periodically-poling control such as the application of a voltage to the nonlinear optical crystal.

If the wavelength conversion element 9 formed of such nonlinear optical crystal or nonlinear optical element is located within the resonator 30, power density of oscillation light enclosed in the resonator 30 increases, thereby achieving high efficiency in wavelength conversion. If, on the other hand, the nonlinear optical crystal or the nonlinear optical element is located outside of the resonator 30, pulse oscillation may be required, and hence continuous oscillation can be performed.

When the excitation light source 1 such as the above-mentioned one-dimensional laser array is used, the laser medium 6 is excited in the elliptic lateral mode pattern. Consequently, the wavelength conversion element 9 is irradiated with thus obtained linear beams as a fundamental wave through the reflection unit 7. At that time, if an adjacent mirror such as the reflection unit 7 or the resonator mirror 10 that excites the wavelength conversion element 9 is used as the concave mirror, the fundamental wave is converged in the wavelength conversion element 9, thereby causing to excite a higher harmonic wave. Thus, it may be possible to improve conversion efficiency from the fundamental wave to the higher harmonic wave.

The linear higher harmonic wave beam that is wavelength-converted in the wavelength conversion element 9 generates two linear higher harmonic wave beams. The two linear higher harmonic wave beams are generated in the directions approximately extending along resonator light paths across the wavelength conversion element 9. One of the thus generated two beams is retroreflected by the retroreflection unit 11 including elements such as a concave mirror. When the retroreflection unit 11 includes the concave mirror, it is desirable that a radius of curvature of the concave mirror be selected based on a divergent angle of a retroreflected beam, and a beam width and a time coherence length. When a linear lateral multi-beam, for example, is caused to reflect, the apparatus is reduced in size based on the above-described conditions, the radius of curvature can be selected to be approximately 100 mm or below.

Figure 2:
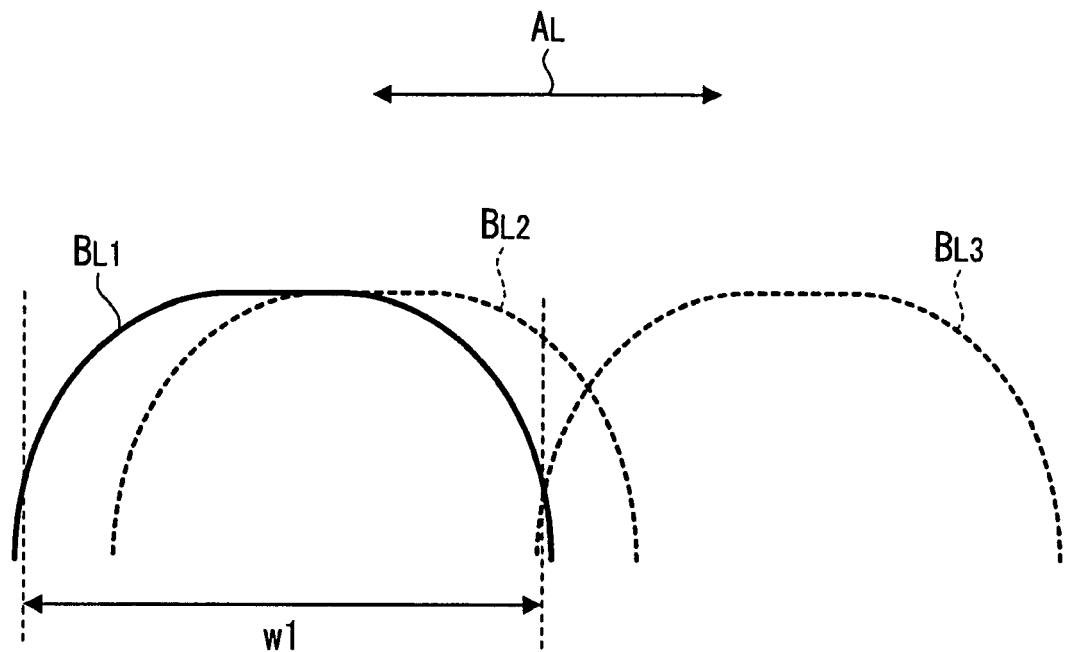
FIG. 2 is an explanatory diagram of one example illustrating a range of an amount of retroreflected beams displaced in a beam major axis direction.
Figure 3:
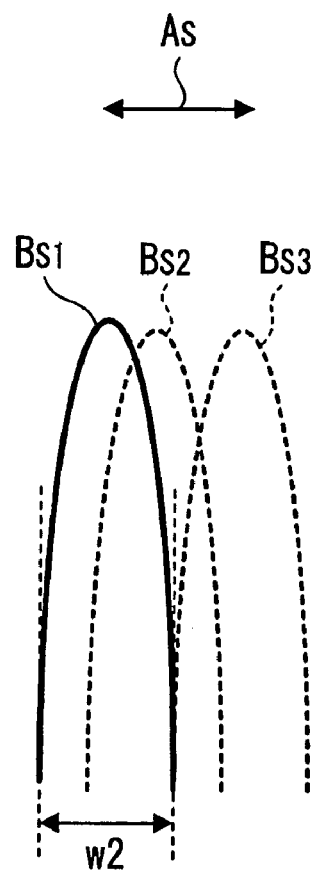
FIG. 3 is an explanatory diagram of one example illustrating a range of an amount of retroreflected beams displaced in a beam minor axis direction.
Figure 4:
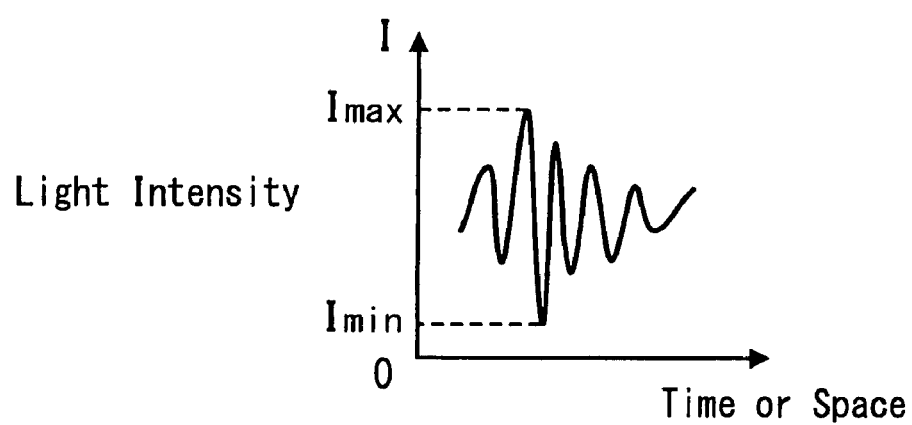
FIG. 4 is an explanatory diagram illustrating a definition of interference visibility.

In one example, the laser light source apparatus include the laser medium 6 made of Nd:YVO$_4$, a nonlinear optical crystal made of LiTaO$_3$ having a periodically-poled structure as the wavelength conversion element 9, and a concave mirror having radius of curvature of 30 mm based on the conditions such as a time coherence length of higher harmonic wave and a beam diameter, noises in the higher harmonic wave output light generated by displacing spatial position of a retroreflected higher harmonic wave were examined. In this example, a linear fundamental wave beam of an elliptic type is generated from the laser medium 6 using the excitation light source 1 of a linear higher harmonic wave lateral multi-beam, and is introduced into the wavelength conversion element 9 to generate a linear higher harmonic wave beam of an elliptic type. One of two higher harmonic waves generated in the wavelength conversion element 9 reflected by the retroreflective unit 11 is spatially displaced in a major axis direction and a minor axis direction of the elliptic type beam so that the higher harmonic wave is reflected and superposed on the other higher harmonic wave generated in the other direction. FIGS. 2 and 3 show profiles in which the retroreflected beams are displaced in the major axis direction and the minor axis direction of the elliptic beam, respectively. When 10% or more as shown by a broken line $B_{L2}$ of a whole width w1 of a beam $B_{L1}$ is displaced in the major axis direction shown by an arrow $A_L$ in FIG. 2, or 35% or more of the whole width w2 of a beam $B_{S1}$ as shown by a broken line $B_{S2}$ is displaced in the minor axis direction shown by an arrow $A_S$ in FIG. 3, spatial coherence of the two higher harmonic waves superposed by the wavelength conversion element 9 can sufficiently be decreased, and noises in the total amount of laser beams can be decreased so that the output and the beam profile can be stabilized as compared with a laser light source apparatus in which the retroreflected higher harmonic wave is not displaced spatially.

It should be noted that the beams $B_{L1}$ and $B_{S1}$ in FIGS. 2 and 3 show intensity distributions of the cross-sections in the major axis direction and minor axis direction of the higher harmonic wave on the reflection surface of the retroreflection unit 11, respectively. The whole width of the beam is determined as a width obtained at the position in which the intensity distribution in the beam cross-section is $1/e^2$ (e is a base of a natural logarithm) of an optical axis intensity. Further, broken lines $B_{L3}$ and $B_{S3}$ in FIGS. 2 and 3 show intensity distributions obtained when the beams are displaced in position approximately 100% of the beam whole width.

As described above, when a higher harmonic wave is obtained by using the lateral multimode fundamental wave, coherence can be effectively decreased with a smaller amount of displacement by displacing the beams in the major axis direction of the higher harmonic wave because lights with different modes are low in coherence. Accordingly, coherence visibility can decrease to desired visibility by displacing a relatively small amount of spatial displacement.

When a fundamental wave is converged in the wavelength conversion element 9 using the resonator mirror or using a concave mirror as the reflection unit 7 shown in FIG. 1, interference coherence can securely be decreased by superposing retroreflected higher harmonic waves after having displaced spatially as described above.

It should be noted that the amount of spatial displacement that may be required to sufficiently reduce higher harmonic waves and to obtain a stable output generally changes depending on characteristics of laser such as the number of longitudinal and lateral modes of laser light and use of higher harmonic waves, that is, types of the applied optical apparatus. In general, the amount of beam displacement or more obtained when visibility (contrast of interference fringes) of interference fringes obtained by superposing two higher harmonic waves with optical axes displaced from each other is relative to the state in which two higher harmonic waves interfere with each other when the optical axes matched is decreased to $1/e^2$, that is, spatial coherence length.

In FIG. 1, a y-axis is determined as a direction perpendicular to the surface of the substrate on which the resonator mirrors 5 and 10 forming the resonator 30 are mounted, a z-axis is determined as a direction extending along an optical axis of light introduced into the retroreflection unit 11, and an x-axis is determined as a direction perpendicular to the respective y-axis and z-axis. With the x-axis direction, for example, when a ratio of an amount of the positional displacement in which interference intensity of higher harmonic wave acquires $1/e^2$ of interference visibility base on the whole width of beam is P %, the amount of positional displacement in the x-axis direction can optionally be in a range of P % to 100% according to applications. If the ratio of displacement exceeds 100%, beams will separate, and thus the ratio exceeding 100% if displacement is not be preferable.

Similarly, in the y-axis direction, when a ratio of the positional displacement in which interference intensity of higher harmonic wave acquires $1/e^2$ of visibility based on the whole width of beam is R %, the amount of the positional displacement in the y-axis direction can be in a range of R % to 100%.

It should be noted that visibility is a value (Imax−Imin)/(Imax+Imin) resulting from dividing a difference between a maximum intensity Imax and a minimum intensity Imin of time or spatial intensity distribution of interfering lights by a sum of a maximum intensity and a minimum intensity which indicates a scale representing a degree of interference. Fluctuations of light intensity due to interference effects of two laser lights may affect an illumination profile, that is, fluctuation of image quality in an optical apparatus such as an image generating apparatus. Accordingly, it is preferable that a light source include small fluctuation so that interference effect can be reduced to the maximum extent.

Figure 5:
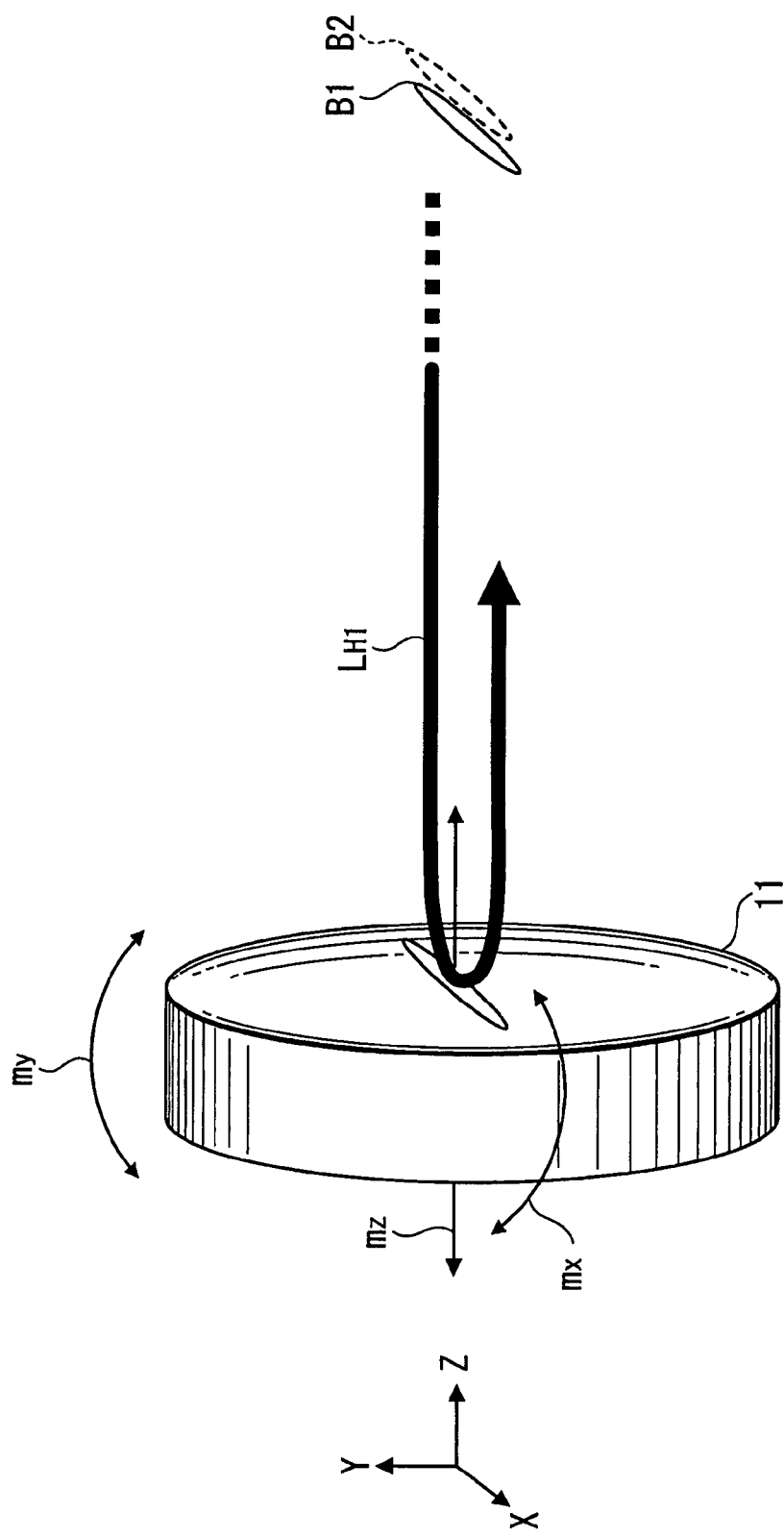
FIG. 5 is an explanatory diagram illustrating a moving direction of a retroreflection unit.

FIG. 5 is a schematic configuration diagram illustrating the direction in which the retroreflection unit 11 is displaced. In FIG. 5, elements and parts identical to those of FIG. 1 are denoted by identical reference numerals, and the description thereof is thus omitted. A higher harmonic wave generated from a wavelength conversion element (not shown) is introduced into the retroreflection unit 11 as shown by an arrow $L_{H1}$, spatially displaced and reflected. A solid line B1 shows a beam shape of a higher harmonic wave retroreflected by the retroreflection unit 11 and a broken line B2 shows a beam shape of a higher harmonic wave emitted from a waveform conversion element onto the opposite side of the higher harmonic wave introduced into and emitted from the retroreflection unit 11. As shown by arrows mx and my, the retroreflection unit 11 including the concave mirror and other elements forms a driving unit such that the retroreflection unit 11 can move so as to rotate around the x-axis direction and the y-axis direction and can translate in the z-axis direction approximately extending along the resonance light path as shown by an arrow m/z. The driving unit may have a structure such that a driving mechanism is added to a manipulator (manipulation mechanism) or a supporting body. As a result, it is possible to adjust three axes, such as latching in the x-axis direction and the y-axis direction, and translating in the z-axis direction. Further, although not shown, the retroreflection unit 11 can move so as to translate in the x-axis direction and/or y-axis direction.

When the retroreflection unit 11 is formed of the concave mirror, it is desirable that a radius of curvature thereof can be ½ or more of time coherence length of higher harmonic wave. As a consequence, since the retroreflection unit 11 is located in the wavelength conversion element having a distance of ½ or more of time coherence length of higher harmonic wave; that is, the distance of reciprocating light path length time coherence. Thus, since time interference in addition to spatial coherence may be decreased and hence occurrence of interference fringes can more reliably decreased.

Figure 6B:
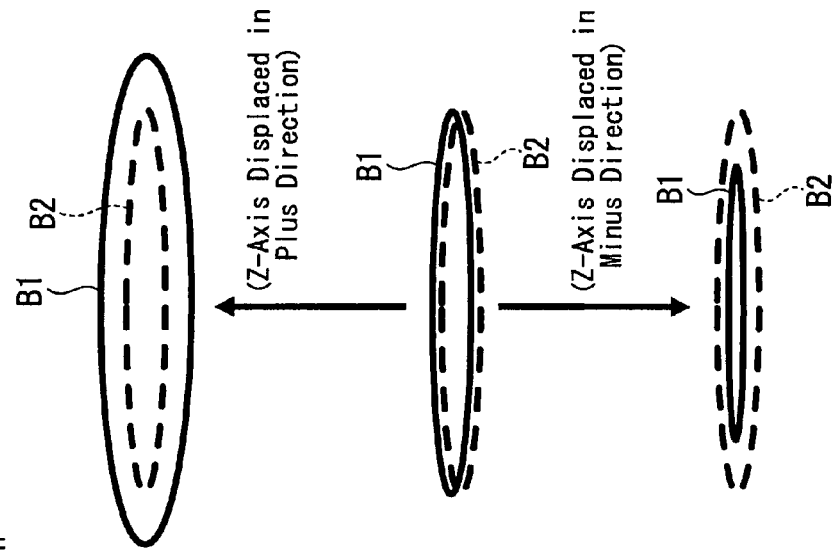
FIG. 6B is a diagram illustrating a profile in which laser beams are superposed when an amount displaced in the z-axis direction is changed.
Figure 6A:
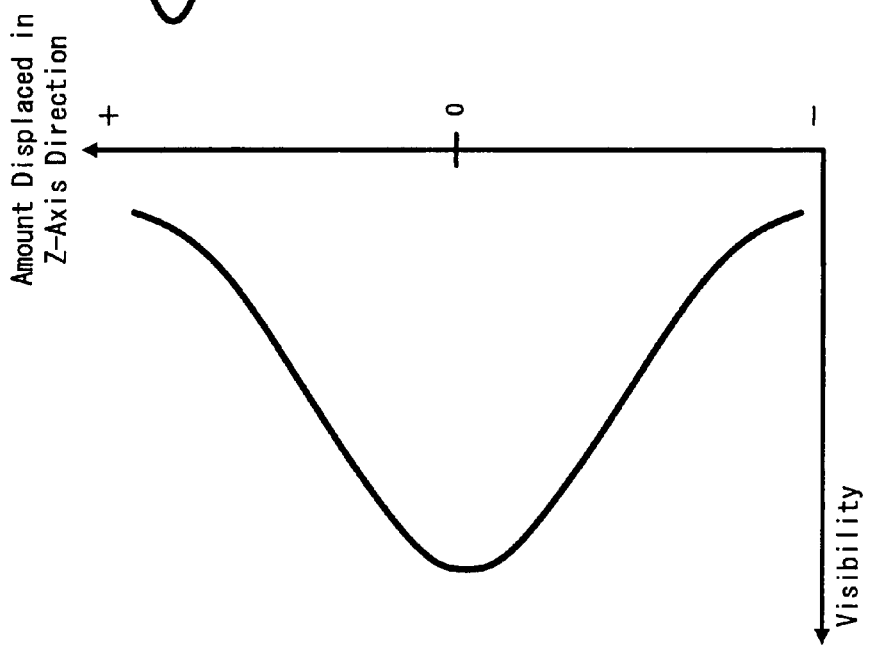
FIG. 6A is a diagram illustrating changes of visibility relative to an amount displaced in the z-axis direction.

In the case where the concave mirror is used as the retroreflection unit 11 as described above, if the concave mirror is displaced in the z-axis direction, intensities of the superposed higher harmonic wave beams B1 and B2 are also changed. FIGS. 6A and 6B show these profiles. FIG. 6A shows an area of visibility based on the position of the z-axis direction and FIG. 6B shows profiles in which the beams B1 and B2 are superposed at respective positions. The area of visibility achieves maximum when the concave mirror is located at the position 0, the intensities of the beams B1 and B2 are approximately the same, and visibility decreases as the concave mirror is displaced in the plus and minus directions. If the concave mirror is displaced in the plus direction of the z-axis, the retroreflected beam B1 will be larger than the beam B2. If, on the other hand, the concave mirror is displaced in the minus direction of the z-axis, the retroreflected beam B1 will be smaller than the beam B2.

The amount of displacement of the retroreflection unit 11 can be decreased by adjusting two or more axes of the axes in five directions for rotating around the x-axis direction and the y-axis direction and translating in the x-axis direction and the y-axis direction including adjusting translation in the x-axis direction as compared with adjusting the retroreflection unit 11 independently in each axis direction.

Figure 7:
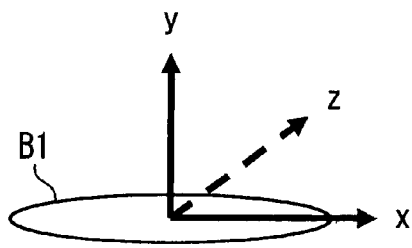
FIG. 7 is an explanatory diagram illustrating the moving direction of a retroreflected beam.
Figure 8A:
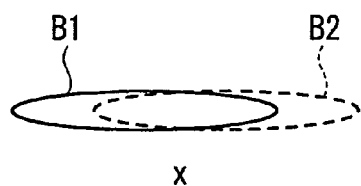
FIGS. 8A to 8G are diagrams showing profiles in which higher harmonic wave beams are superposed when the retroreflection unit rotates around the x-axis, y-axis, and z-axis directions, or the retroreflection unit translates in the x-axis, y-axis, and z-axis directions, respectively.
Figure 8B:
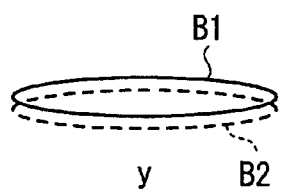
Figure 8C:
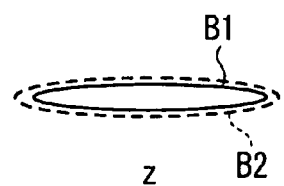
Figure 8D:
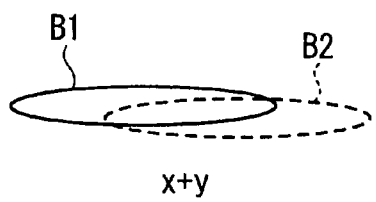
Figure 8E:
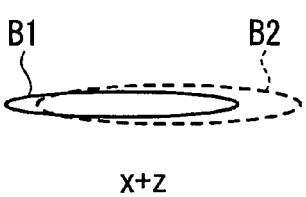
Figure 8F:
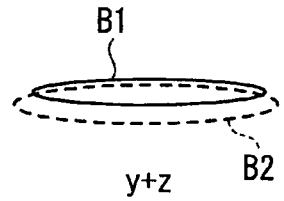
Figure 8G:
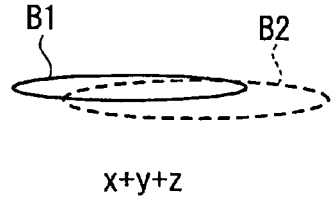

As shown in FIG. 7, when the retroreflection unit 11 is displaced so as to rotate around the x-axis direction and the y-axis direction or so as to translate in the x-axis direction and the y-axis direction, and so as to translate in the z-axis direction based on the intensities of the beam B1, the beams B1 and B2 can be spatially displaced in seven directions as shown in FIGS. 8A to 8G. In FIGS. 8A to 8G, elements and parts identical to those of FIG. 5 are denoted by identical reference numerals and therefore need not be described. FIGS. 8A to 8C show profiles in which the beams B1 and B2 are superposed on each other when the retroreflection unit 11 is independently displaced so as to rotate around or translate in the x-axis direction, to rotate around and translate in the y-axis direction, and to translate in the z-axis direction, respectively. FIGS. 8D to 8F show profiles in which the beams B1 and B2 are superposed on each other when the retroreflection unit 11 is displaced in two directions with a combination of rotating around or translating in the x-axis and the y-axis directions, a combination of rotating around or translating in the x-axis and the z-axis directions, and a combination of rotating around or translating in the y-axis and z-axis directions, respectively. FIG. 8G shows a profile in which the beams B1 and B2 are superposed on each other when the retroreflection unit 11 is displaced in three directions with a combination of rotating around or translating in the x-axis and y-axis directions and translating in the z-axis direction.

Figure 9:
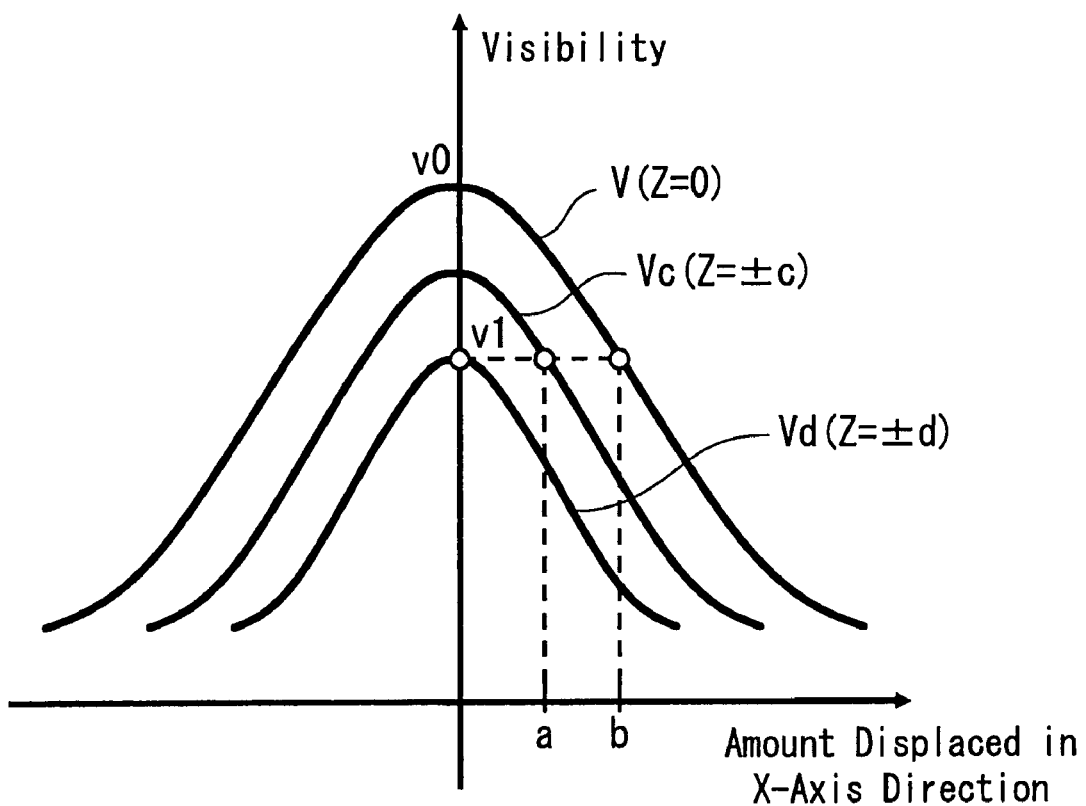
FIG. 9 is a diagram showing changes visibility relative to an amount displaced in the x-axis direction and an amount of displacement in the z-axis direction.

One example will be described with reference to FIG. 9, an amount of displacement for visibility can be decreased when the position of the retroreflection unit 11 is displaced in the two-axis directions of the x-axis and the y-axis directions. FIG. 9 shows a profile in which visibility change based on an amount in which the retroreflection unit 11 is displaced in the x-axis direction. I FIG. 9, Z represents an amount of displacement in the z-axis direction, a solid line V represents Z=0, a solid line Vc represents Z=±c, and a solid line Vd represents Z=±d (d>c), respectively.

When the retroreflection unit 11 is not displaced in the z-axis direction (solid line V), for example, if b represents an amount of displacement in the x-axis direction, visibility decreases from v0 to v1.

Conversely, if the retroreflection unit 11 is not displaced in the x-axis direction but is displaced with the amount d of displacement Z in the z-axis direction, visibility decreases from v0 to v1.

On the other hand, if the retroreflection unit 11 is displaced with the amount of displacement c in the plus and minus directions of the z-axis, and also displaced with the amount of displacement a (<b) in the x-axis direction, visibility can similarly decrease from v0 to v1. If the retroreflection unit 11 is displaced in the y-axis direction in addition to the x-axis and the z-axis directions, the amount of displacement can decrease in each axis direction.

That is, FIGS. 2 and 3 show that the retroreflection unit 11 is displaced in the respective directions (either in the major-axis direction or minor-axis direction when the lateral multi-mode beam is used). Accordingly, when the retroreflection unit 11 is displaced in two or more axes directions, although an amount of displacement is less than the spatial coherence length, then visibility can decrease to $1/e^2$ or below in total based on the optical axis direction.

In this case, since the amount of displacement a in the x-axis direction is less than b showing a decrease, deformation of a beam may be controlled. Also, since the amount of displacement in the z-axis direction also shows a decrease, a distance and space of displacement with the retroreflection unit 11 can be suppressed, thereby decreasing the size of the laser light source apparatus.

Further, when the concave mirror is used as the retroreflection unit 11, if the adjustment apparatus including the adjustment mechanism capable of adjusting the five-axis directions of rotating around or translation in the x-axis direction, rotating around or translation in the y-axis direction, and translating in the z-axis direction is used, since rotation or translation of the retroreflection unit 11 can be effectively adjusted at maximum level up to the proper beam position with the effective diameter while the laser beam can be prevented from being shaded by the end portion of the concave mirror. As a result, the diameter and radius of curvature of the concave mirror can be reduced as much as possible.

Figure 10:
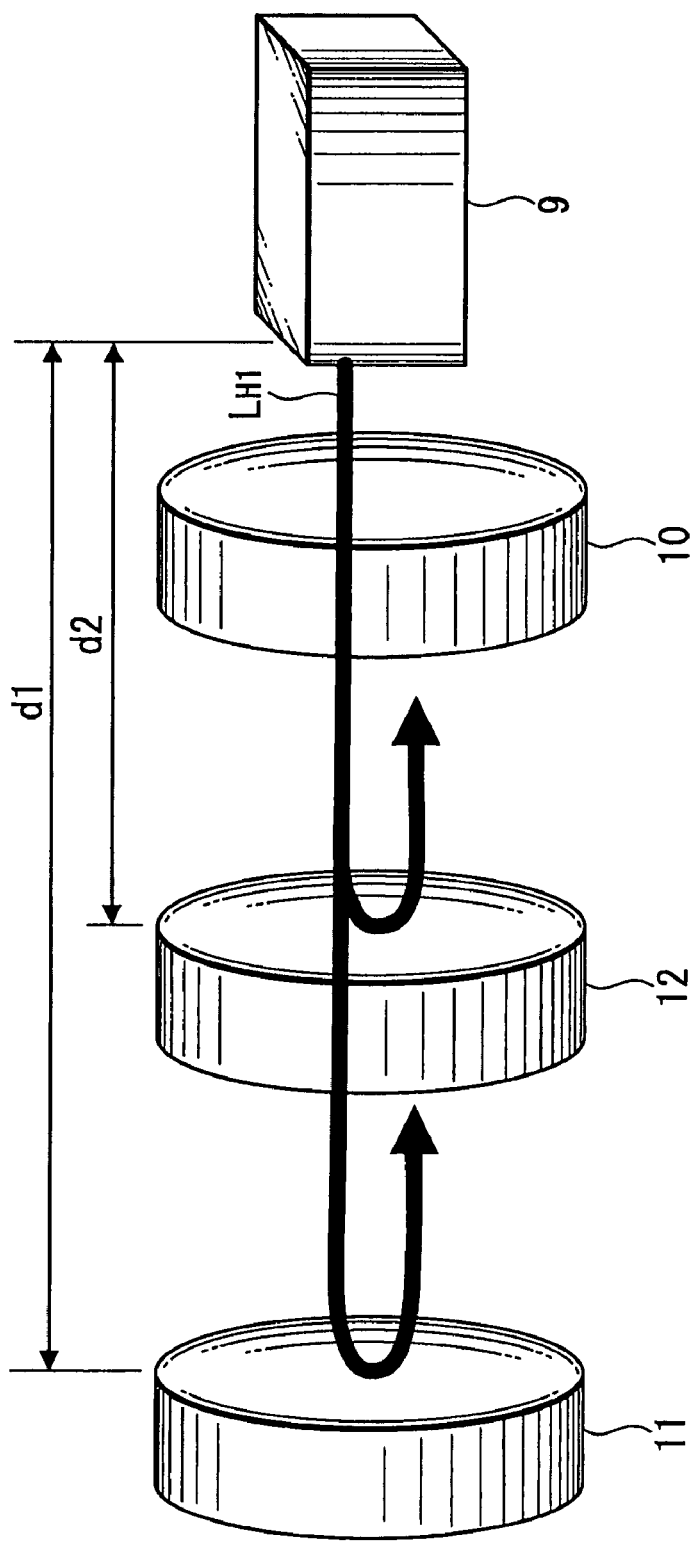
FIG. 10 is an explanatory diagram illustrating positions at which retroreflection units are located.
Figure 11A:
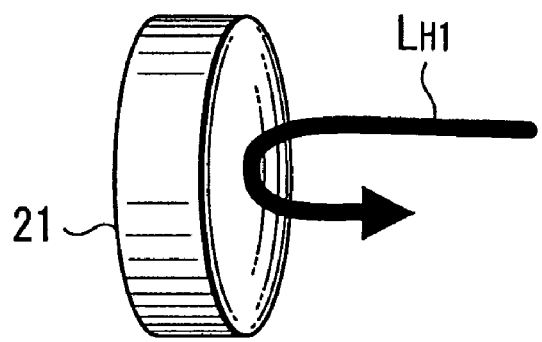
FIGS. 11A to 11D are respectively schematic perspective views showing examples of retroreflection units of a laser light source apparatus according to the embodiments of the present invention.
Figure 11B:
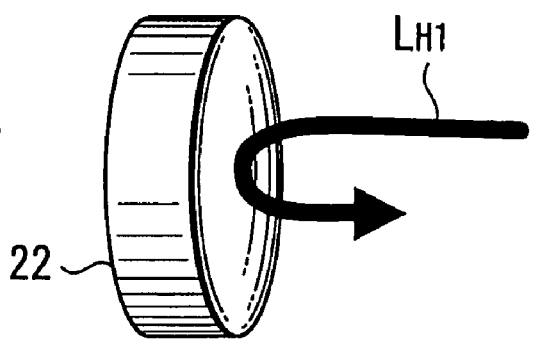
Figure 11C:
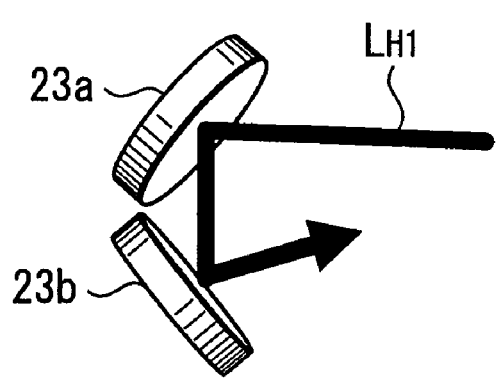
Figure 11D:
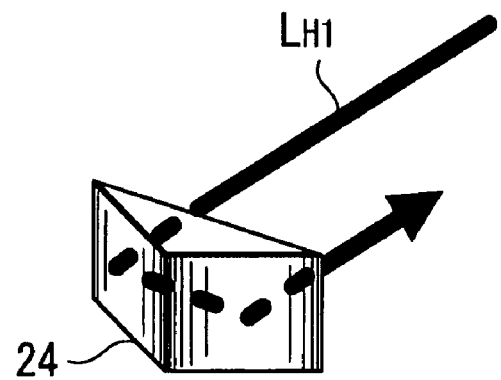

Further, as shown in FIG. 10, when the laser light source apparatus includes a retroreflection unit 12 capable of adjusting rotation or translation of two or more axes directions as compared with the retroreflection unit 11 capable of adjusting rotation or translation of one axis direction, the retroreflection unit can be located with a distance of a time coherence length or less from the wavelength conversion element. As a result, it is possible to reduce a distance between the retroreflection unit 12 and the wavelength conversion element from d1 to d2 (d2<d1), and it is also possible to reduce the diameter of the retroreflection unit 12, though depending on the beam shape. Therefore, the laser light source apparatus can be reduced in size. In FIG. 10, elements and parts identical to those of FIGS. 1 and 5 are denoted by identical reference numerals and therefore need not be described.

As the shape of the retroreflection unit used for the laser light source apparatus according to the present invention, a plane mirror 21, a concave mirror 22, a combination of two plane mirrors 23a and 23b, a prism 24, and the like as shown in FIGS. 11A to 11D. FIGS. 11A to 11D are schematic perspective views showing examples of the shapes of such retroreflection unit. Further, each element may have a function to reflect a fundamental wave in addition to a function to reflect the higher harmonic wave $L_{H1}$.

Figure 12A:
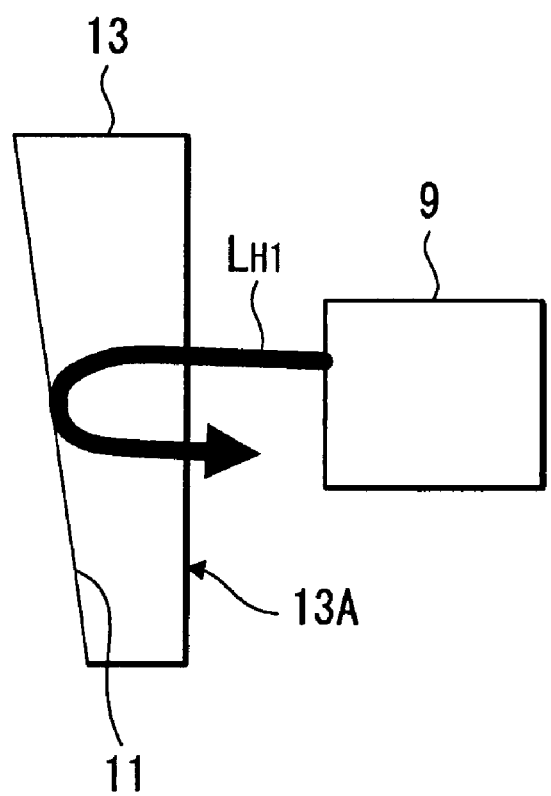
FIGS. 12A and 12B are schematic side views showing examples of retroreflection units of a laser light source apparatus according to the embodiments of the present invention.
Figure 12B:
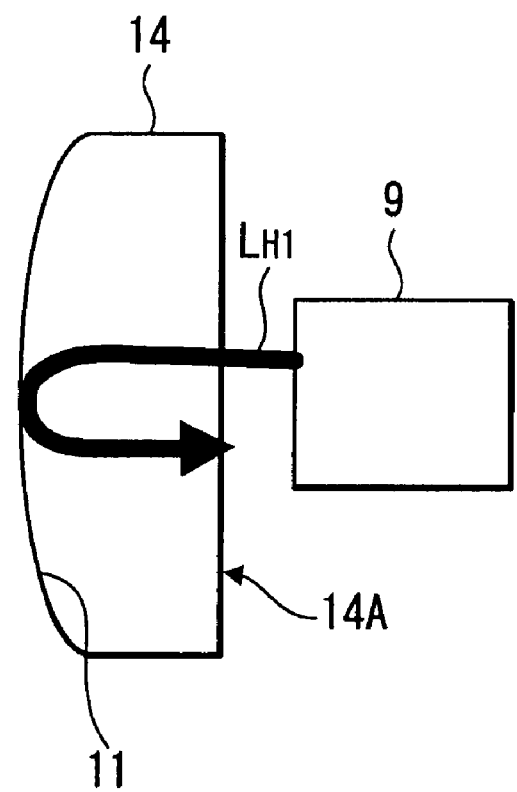

FIGS. 12A and 12B are schematic cross-sectional views of main portions of other examples of laser light source apparatus according to embodiments of the present invention. In FIG. 12A, a substrate with wedge is used as the resonator mirror 13, the resonator mirror surface 13A located at the inside of the resonator has a function to reflect the higher harmonic wave $L_{H1}$ emitted from the wavelength conversion element 9, the wedge surface located at the outside of the resonator is used as the retroreflection unit 11. Accordingly, the laser light source apparatus has a multifunction mirror having a function to reflect the higher harmonic wave $L_{H1}$. Further, in FIG. 12B, a prism having curved surfaces is used as the resonator mirror 14, the resonator mirror surface 14A located at the inside of the resonator has a function to pass the higher harmonic wave $L_{H1}$ emitted from the wavelength conversion element 9, the outer curved surface is used as the retroreflection unit 11. Accordingly, the laser light source apparatus has a multifunction mirror having a function to reflect the higher harmonic wave $L_{H1}$. According to the above laser light source apparatus, the retroreflected higher harmonic wave can be spatially displaced by only providing the resonator mirror 13 or 14. Parts assembly and adjustment can be simplified, the number of parts can be decreased, and the apparatus can be decreased in size.

It should be noted that the retroreflection function can be added to the wavelength conversion element. In this embodiment, a wavelength selection film that can reflect a higher harmonic wave, and the like may be provided at one incident end face, the end face may be provided with a predetermined angle relative to a resonance light path within the wavelength conversion element and an angle of incident of a fundamental wave may be properly selected in response to an angle of inclination of this end face.

Next, schematic configurations of respective embodiments of laser light source apparatus including such retroreflection units will be described with reference to FIGS. 13 to 19.

[1] First Embodiment

Figure 13:
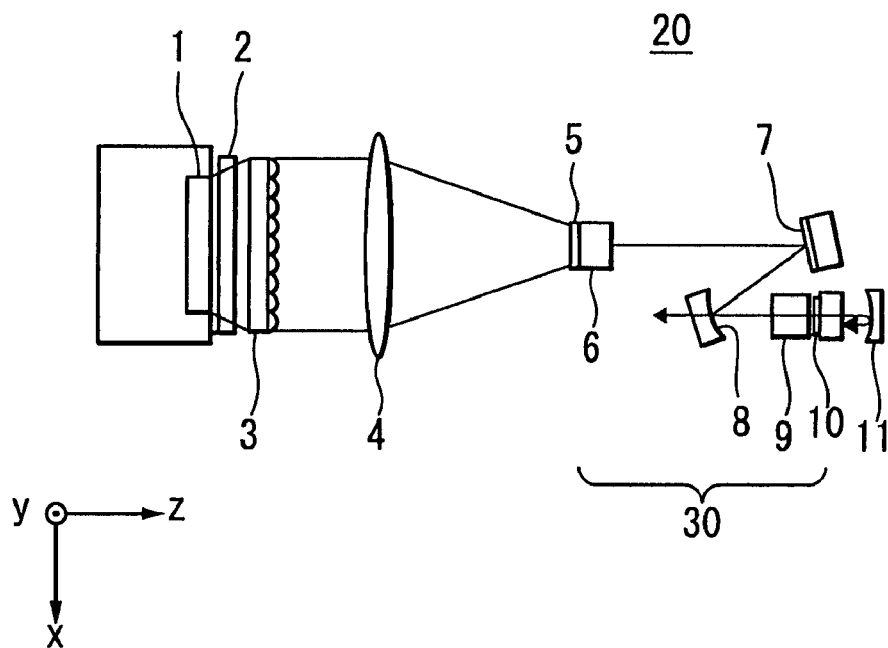
FIG. 13 is a schematic plan view of a laser light source apparatus according to one embodiment of the present invention.
Figure 14:
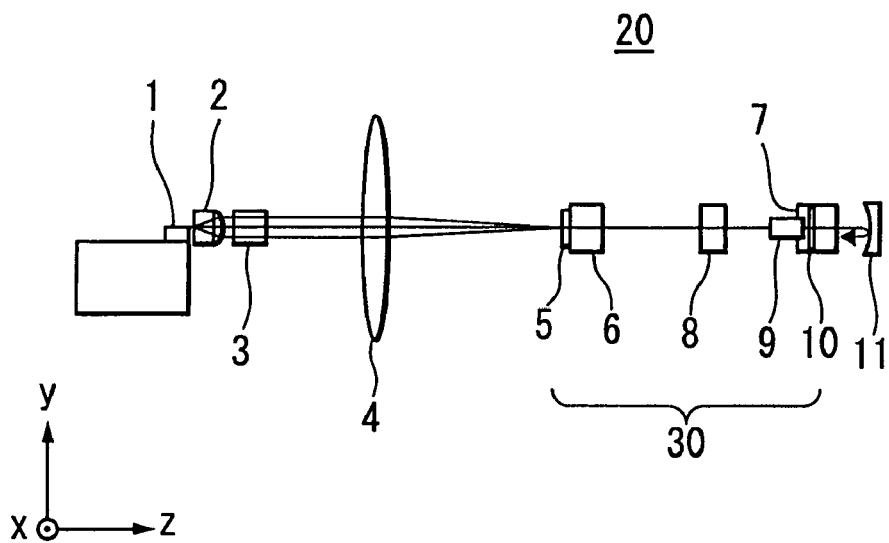
FIG. 14 is a schematic plan view of a laser light source apparatus according to another embodiment of an the present invention.

A schematic plan view and a schematic side view of an example of a laser light source apparatus 20 according to the first embodiment are shown in FIGS. 13 and 14. In this embodiment, the laser light source apparatus 20 employs a solid-state laser including a semiconductor laser array to emit lateral multi-mode laser light as an excitation light source. In FIGS. 13 and 14, elements and parts identical to those of FIG. 1 are denoted by identical reference numerals and therefore need not be described.

As shown in FIGS. 13 and 14, the two collimator lenses 2 and 3, the condenser lens 4, the resonator mirror 5, the laser medium 6 and the reflection unit 7 formed of a concave mirror are located in a light path of light emitted from the excitation light source 1. Another reflection unit 8 including a concave mirror to reflect a fundamental wave at high reflectance and passes a higher harmonic wave at high transmittance is located in a light path of light reflected by the reflection unit 7. The wavelength conversion element 9 including a suitable material such as a nonlinear optical crystal and a nonlinear optical element and the resonator mirror 10 and the retroreflection unit 11 are located in a light path of light reflected by the reflection unit 8. In this manner, when retroreflection light path includes the reflection units 7 and 8 within the resonator 30 formed of the light path between the resonator mirrors 5 and 10 and reduced in size.

In the above-mentioned configuration, lateral multimode laser light emitted from the excitation light source 1 is collimated by the collimator lenses 2 and 3. These collimator lenses 2 and 3 can be formed of cylindrical lenses which collimate diverging lights of respective directions of fast axis and slow axis of a semiconductor laser. The collimator lens 2 can be formed of an aspherical cylindrical lens for collimating light in the fast axis direction and the collimator lens 3 can be formed of a spherical cylindrical lens for collimating light in the slow axis direction and which is matched with an emitter array pitch and a divergence angle of the semiconductor laser. In FIGS. 13 and 14, a y-axis direction represents a direction perpendicular to the surface of a substrate (not shown) on which respective optical devices including the resonator mirrors 5 and 10 are disposed, a z-axis direction represents a direction which extends along the direction in which the wavelength conversion element 9 is irradiated with laser light, and an x-axis direction represents a direction perpendicular to the y-axis direction and the z-axis direction. In this embodiment, laser beam bundles are collimated on the y-z plane by the collimator lens 2 and laser beam bundles are collimated on the x-z plane by the collimator lens 3.

When the semiconductor laser is used, while the semiconductor laser has a large divergence angle within the y-z plane as compared with that within the x-z plane, since individual cylindrical lenses are used based on respective planes, a desired shape of the beam can be obtained by independently controlling respective diameters of emitted laser beams. Moreover, when stigmatism arises due to a size of a light-emitting region of a laser diode, it is preferable that the above-described cylindrical lenses be used to correct the size of the light-emitting region of the laser diode.

Light passed through these collimator lenses 2 and 3 is converged by the condenser lens 4 provided at the later stage and one end of the laser medium 6 is irradiated with the light as a linear beam through the resonator mirror 5. This embodiment shows that the resonator mirror 5 is located on the incident end face of the laser medium 6 as the reflecting film with wavelength selectivity. This resonator mirror 5 is allowed to pass through excited light emitted from the excitation light source 1 at high transmittance and reflects a fundamental wave excited in the laser medium 6 at high reflectance. Then, the fundamental wave excited in the laser medium 6 is introduced through the reflection units 7 and 8, which can reflect excited light at high reflectance into the wavelength conversion element 9 including the nonlinear optical crystal or the nonlinear optical element. The fundamental wave that reaches the resonator mirror 10 through the wavelength conversion element 9 is reflected in the resonator mirror 10 so that the fundamental wave can be reciprocated within the resonator 30.

In the wavelength conversion element 9, second higher harmonic waves, for example, are generated in both directions extended along the z-axis directions in FIGS. 13 and 14. One higher harmonic wave is emitted to the side of the reflection unit 8, passed through the reflection unit 8 with high transmittance relative to higher harmonic waves and output to the outside. Light emitted to the side of the resonator mirror 10 from the wavelength conversion element 9 is passed through the resonator mirror 10 with high transmittance relative to higher harmonic waves, reflected by the retroreflection unit 11 with high reflectance relative to higher harmonic waves, returned through the resonator mirror 10 to the wavelength conversion element 9 and superposed on the other higher harmonic wave emitted toward the reflection unit 8. When the reflection unit 8 and the resonator mirror 10 are designed so as to have high transmittance relative to higher harmonic waves, it is possible to decrease occurrence of stray light by minimizing reflection of higher harmonic waves.

According to the above embodiment, the position of the retroreflection unit 11 is adjusted and a retroreflected higher harmonic wave is spatially displaced and superposed on a higher harmonic wave emitted to the side of the reflection unit 8, whereby interference visibility can be decreased and an output and a beam profile can be stabilized.

Moreover, since this embodiment has the configuration in which the lateral multimode laser light is used as the excitation light from the excitation light source 1 as described above, if the retroreflected higher harmonic wave is displaced in the major-axis direction of the lateral multimode laser light, then it is possible to decrease interference visibility with a relatively small amount of displacement.

Further, although interference is intensified at the beam waist position when the concave mirror is used as the light path retroreflection reflection unit 7 or 8 provided within the resonator 30, if the amount of displacement of the retroreflection unit 11 is adjusted, for example, the retroreflection unit 11 is displaced in the two-axis directions or three-axis directions, then interference can sufficiently be decreased.

[2] Second Embodiment

Next, respective examples of the laser light source apparatus 20 according to the second embodiment of the present invention will be described with reference to FIGS. 15 to 18. In these examples, the laser light source apparatus 20 is configured as a so-called side-pumping type laser light source which emits excited light from a laser medium. In FIGS. 15 to 18, elements and parts identical to those of FIGS. 13 and 14 are denoted by identical reference numerals and thus description thereof is thus omitted.

When the laser light source apparatus is configured as the side-pumping type laser light source apparatus, the number of parts can be decreased and a cost can be decreased effectively by simplifying the configuration, optical portions to be adjusted can be decreased and assembly and adjustment work can be simplified.

Figure 15:
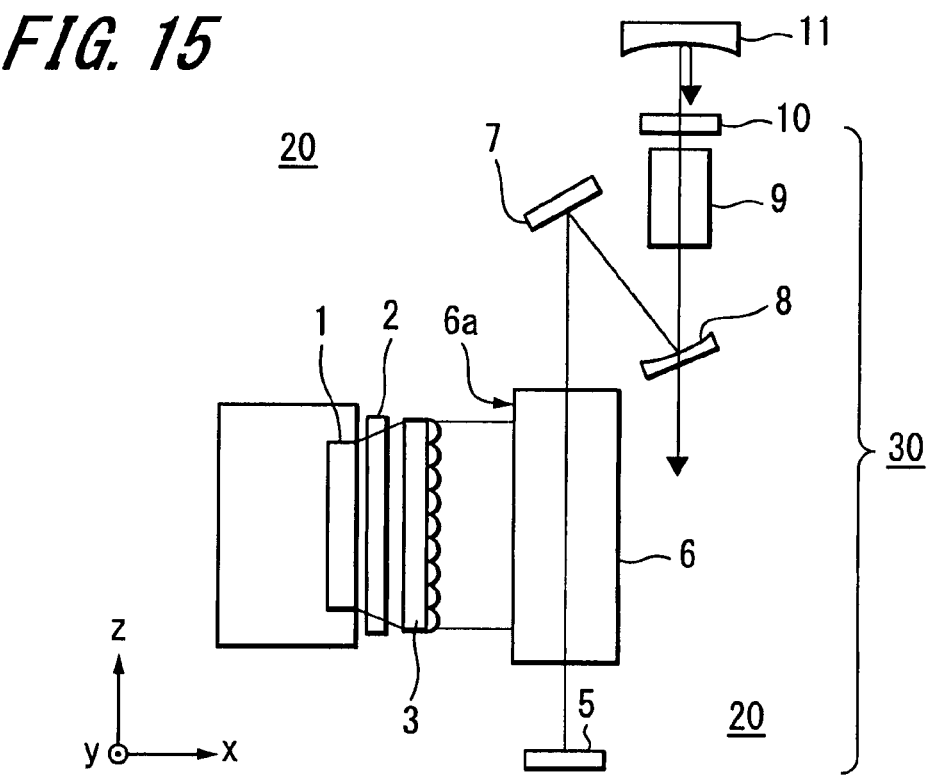
FIG. 15 is a schematic plan view of a laser light source apparatus according to still another embodiment of the present invention.

FIG. 15 shows an embodiment in which the two collimator lenses 2 and 3 are used similarly to the first embodiment described above with reference to FIGS. 13 and 14. In addition, FIG. 16 shows another embodiment in which one collimator lens 2 is used and the example shown in FIG. 17 shows another embodiment in which no collimator lens is used but the side surface 6A of the laser medium 6 is directly irradiated with excited light emitted from the excitation light source 1.

It should be noted that, in these respective embodiments, the output axis of the laser medium 6 is used as the major-axis direction of the lateral multimode light of the excitation light source 1. When this major-axis direction is determined as the z-axis direction, the side surface of the laser medium 6 is irradiated with excited light perpendicular to the x-axis direction in the x-axis direction perpendicular to the z-axis direction and extends along the surface of the substrate (not shown) on which respective optical devices are located. In FIG. 15, since the collimator lenses 2 and 3 are used, laser light is converged on the x-y plane of FIG. 15 by the collimator lens 2 and laser light is converged within the x-z plane of FIG. 15 by a micro-lens of the collimator lens 3. Then, the thus collimated parallel light is perpendicularly introduced into the side surface 6A of the laser medium 6.

Figure 16:
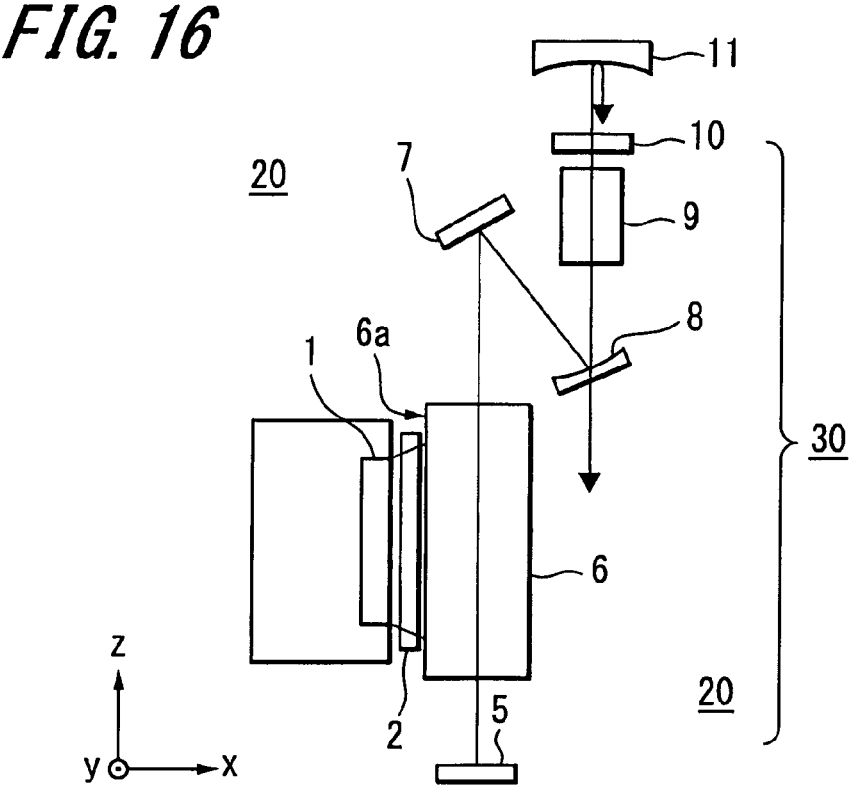
FIG. 16 is a schematic plan view of a laser light source apparatus according to yet still another embodiment of the present invention.
Figure 17:
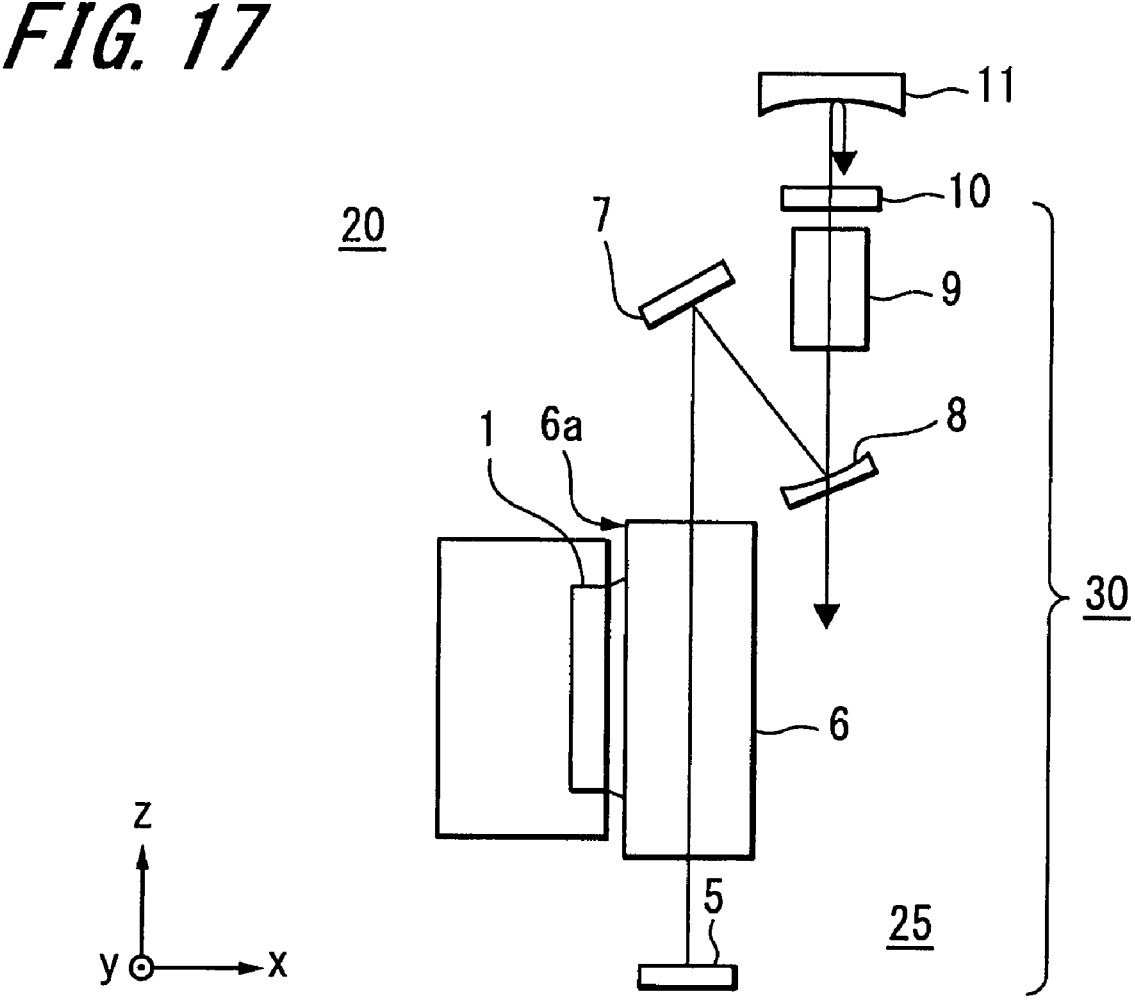
FIG. 17 is a schematic plan view of a laser light source apparatus according to yet still another embodiment of the present invention.

Further, in FIG. 16, the collimator lens 3 is not used and laser light is collimated within only the x-y plane.

The reflection unit 7 is located in a light path of a fundamental wave emitted from the laser medium 6, the reflection unit 8 including a concave mirror is located in a light path of light reflected by the reflection unit 7 and the wavelength conversion element 9, the resonator mirror 10, and further the retroreflection unit 11 are located in a light path of light reflected by the reflection unit 8. The resonator mirror 5 and the reflection units 7 and 8 are designed so as to have high reflectance relative to the fundamental wave.

As the laser medium 6, various materials similar to those in FIG. 1 are used such as Nd:YAG. Examples of the shape of the laser medium 6 of the laser medium 6 include a plate-like laser medium or a shape processed in a manner such that the end face thereof in the major axis direction is inclined relative to a plane perpendicular to the major axis so as to obtain incident conditions at Brewster's angle.

As the wavelength conversion element 9, the above-mentioned nonlinear optical element or nonlinear optical crystal made of various materials are employed as similar to those described in FIG. 1.

According to the above configuration, the laser medium 6 is irradiated with the excited light emitted from the excitation light source 1 and fundamental waves generated by laser oscillation are emitted from the laser medium 6 at the respective end faces thereof in the major axis direction (z-axis direction). One laser light reaches the resonator mirror 5, where the light is reflected in the opposite direction. The other laser light (fundamental wave) is output to the reflection unit 7. It should be noted that, in the side-pumping type laser light source, the breadth of the laser medium 6 (width of the z-axis direction) corresponds to an aperture to determine a width of a beam. Further, the size of the beam can be determined by selecting the radiuses of curvature of the reflection units 7 and 8, for example, in the width of the longitudinal direction (y-axis direction).

The laser light traveling along the z-axis direction and reached the reflection unit 7 is reflected at the reflection unit 7, traveled toward the reflection unit 8, further reflected at the reflection unit 8, thereby introducing into the wavelength conversion element 9. The fundamental wave passed through the wavelength conversion element 9 is reflected by the resonator mirror 10 and reciprocated between the resonator mirror 10 and the resonator mirror 5.

In the wavelength conversion element 9 into which the fundamental wave is introduced, a higher harmonic wave based on SHG (second harmonic generation) is generated in two directions extending along the optical axis and one higher harmonic wave is passed through the reflection unit 8 and output to the outside. The other higher harmonic wave is passed through the resonator mirror 10 and reflected by the retroreflection unit 11 with high reflectance relative to higher harmonic waves.

Similarly, in FIG. 1, the higher harmonic wave reflected by the retroreflection unit 11 and the higher harmonic wave emitted to the other side can be spatially displaced and superposed each other in the wavelength conversion element 9 by adjusting the configuration position and reflection angle of the retroreflection unit 11. As a result, it is possible to decrease interference effect caused when higher harmonic waves are superposed each other, and hence it is also possible to stabilize outputs and a beam profile.

In this embodiment, since the lateral multimode laser light is used as the excitation light from the excitation light source 1 as described above, if the retroreflected higher harmonic wave is displaced in the major-axis direction of the lateral multimode laser light, it is possible to decrease interference visibility with a relatively small amount of displacement.

Further, although interference is intensified at the beam waist position when the concave mirror is used as the light path retroreflection reflection unit 7 or 8 provided within the resonator 30, if the amount of displacement of the retroreflection unit 11 is adjusted, the retroreflection unit 11 is displaced in the two-axis directions or three-axis directions, interference can sufficiently be decreased.

In FIGS. 16 and 17, the collimator lens 3 and the collimator lenses 2 and 3 are omitted and hence the number of parts can be decreased. Particularly in FIG. 17, since no collimator lenses are used and the laser medium 6 is directly irradiated with the light emitted from the excitation light source 1 to excite the laser medium 6, the number of parts can be decreased and optical alignment may no longer be necessary, thereby simplifying the manufacturing process and decreasing the number of steps.

It should be noted that, in FIG. 17, when excitation laser light emitted from the excitation light source 1 is introduced into the laser medium 6 with a relatively large divergence angle within the x-y plane, if this laser light is passed through the laser medium 6 and leaked to the outside, efficiency will deteriorate. Thus, it is preferable that the laser medium 6 be provided with a light confining device, for example, the laser medium 6 may be disposed to include an angle of inclination by using total reflection conditions. Specifically, an angle of the laser medium may be set and the laser medium 6 may be polished such that light incident on the laser medium 6 may be reflected totally therein. In this embodiment, an additional device such as a reflection member may not be used. In addition, a reflecting film may be formed on the side surface of the laser medium 6 and a separate reflection member can be annexed to the laser medium 6. According to the above configurations, excited light can be enclosed within the laser medium 6 efficiently.

As set forth above, according to the second embodiment, since the laser light source apparatus 20 employs the side pumping type laser light source apparatus, the laser light source apparatus 20 can be made relatively simple and suitable for outputting large power. Since excited light can be dispersed, as compared with the case in which the laser light source apparatus 20 is used as the end-pumping type laser light source apparatus, heat may easily be exhausted for heat radiation of the laser medium. Accordingly, stability and longevity may be improved. Further, in the case of the one-dimensional lateral multimode oscillation, it is possible to obtain efficiency approximately equal to that of the end-pumping type laser light source apparatus by devising an excitation method.

In FIG. 15, since laser light is collimated by the collimator lenses 2 and 3, highly-efficient side-pumping type laser light source apparatus can be achieved by exciting the laser medium 6 with parallel lights. If an oscillation mode size and the size of excited light are mutually matched in the one-dimensional lateral multimode oscillation, highly-efficient oscillation similar to that of the end-pumping type can be formed.

Further, in FIG. 16, laser light can be collimated within the x-y plane by using the collimator lens 2 and the oscillation mode size and the size of excited light can be mutually matched in the longitudinal direction (z-axis direction) of the laser medium 6.

Moreover, since the example shown in FIG. 17 has the configuration without the collimator lens, the number of parts can be decreased, a cost can be decreased, and manufacturing processed can be simplified.

Figure 18:
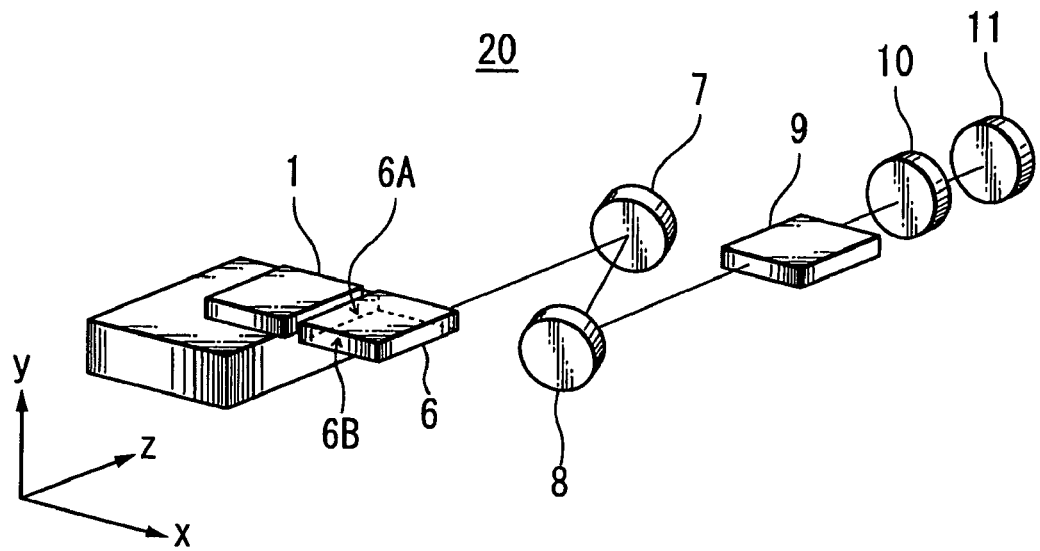
FIG. 18 is a schematic perspective view of a laser light source apparatus according to yet still another embodiment of the present invention.

FIG. 18 is a schematic perspective view showing a case in which the resonator mirror 5 is integrated with the rear end face of the laser medium 6 in the laser light source apparatus 20 shown in FIG. 17. In FIG. 18, elements and parts identical to those of FIG. 17 are denoted by identical reference numerals and the description thereof is thus omitted. Specifically, in FIG. 18, the side surface 6A of the laser medium 6 is directly irradiated with excited light emitted from the excitation light source 1 to excite the laser medium 6 and the rear end face 6B is designed to have high reflectance relative to the fundamental wave oscillated within the laser medium 6 with respect to the advancing direction (z-axis direction) of the oscillated fundamental wave so that the resonator mirror 5 can be removed. According to the above configuration, the number of parts can be decreased more and a cost can be decreased more.

Further, since the higher harmonic wave returned to the wavelength conversion element 9 can be emitted toward the reflection unit 8, spatially displaced and superposed on the higher harmonic wave, it is possible to decrease interference effect.

Figure 19:
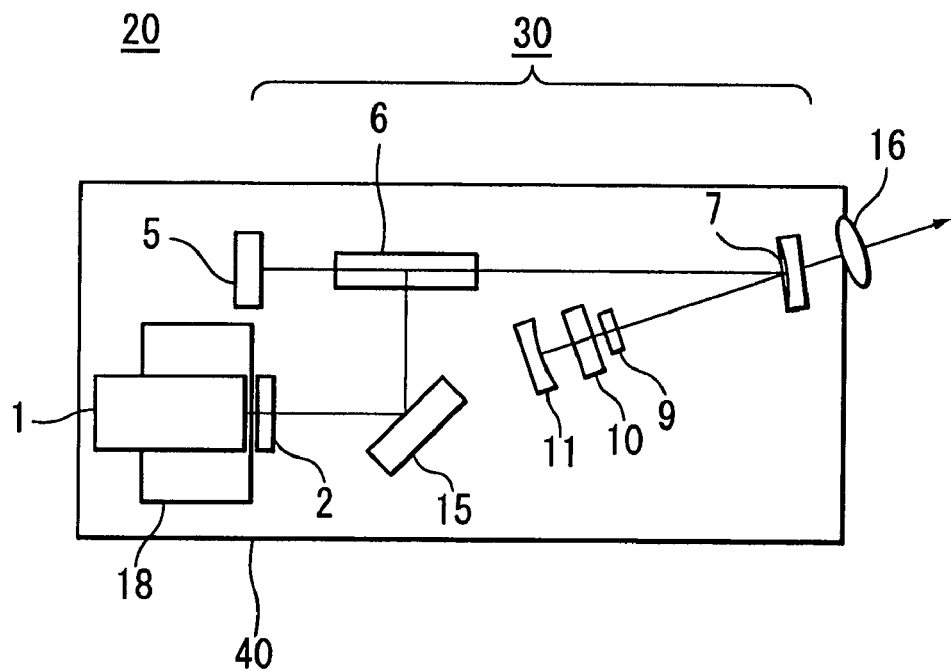
FIG. 19 is a schematic plan view of a laser light source apparatus according to yet still another embodiment of the present invention.

In FIG. 19, only the collimator lens 2 is used as shown in FIG. 16 and a laser light source apparatus 20 is used as a side-pumping type laser light source apparatus in which light collimated by the collimator lens 2 is reflected at the reflection unit 15, with which the side surface of the laser medium 6 is irradiated. In FIG. 19, elements and parts identical to those of FIG. 16 are denoted by identical reference numerals and therefore need not be described.

In this case, the resonator 30 includes the resonator mirror 5 formed of a plane mirror, the reflection unit 7 including a concave mirror and the reflection unit 10 formed of a plane mirror, and the wavelength conversion element 9 is located in a light path between the reflection unit 7 and the resonator mirror 10.

The reflection unit 10 has the retroreflection unit 11 for retroreflecting a higher harmonic wave emitted from the wavelength conversion element 9 located at its side opposite to the wavelength conversion element 9.

In addition, higher harmonic waves can be spatially displaced and superposed on each other within the wavelength conversion element 9 by adjusting the configuration position and reflection angle of the retroreflection unit 11, as shown in the above-mentioned respective embodiments. As a result, interference effect can be decreased and outputs and a beam profile can be stabilized.

Further, since this embodiment has the configuration in which the lateral multimode laser light is used as the excitation light from the excitation light source 1 as described above, if the retroreflected higher harmonic wave is displaced in the major-axis direction of the lateral multimode laser light, it is possible to decrease interference visibility with a relatively small amount of displacement.

Moreover, although interference is intensified at the beam waist position when the concave mirror is used as the reflection unit 7 for retroreflecting the light path provided within the resonator 30, if the amount of displacement of the retroreflection unit 11 is adjusted, for example, the retroreflection unit 11 is displaced in the two-axis directions or three-axis directions, then interference can be decreased sufficiently.

In the above-mentioned respective laser light source apparatus, optical devices having a periodically-poled structure may preferably be used as the wavelength conversion element 9. Since this optical device has a large nonlinear optical constant as compared with that of the related-art nonlinear optical crystal, high conversion efficiency can be obtained, and the apparatus can be mass-produced by a wafer process technology, thereby decreasing cost. When an embodiment of the present invention is applied to nonlinear optical elements (SHG device, etc.) having a periodically-poled structure, if periodically-poled stoichiometric lithium tantalate (PPSLT) processed by vapor transport equilibration (VTE) is used as a periodically-poled material, an optical device with a greater resistance against optical damage, excellent in long-term reliability, and high conversion efficiency can be obtained, so that high output light (SHG light, etc.) of higher than several watt can securely be obtained. In addition, if a lateral multimode direction and the lateral multimode direction of a slab laser are mutually matched, a power scaling can be obtained in the lateral direction.

As described above, according to the laser light source apparatus of the embodiment of the present invention, it is possible to provide a laser light source apparatus in which at least spatial interference effect can be decreased and a stable output and a stable beam profile can be obtained.

Since not only can be time coherence decreased but also spatial interference effect can be reduced, a space used for retroreflecting laser light can be reduced in distance as compared with a case in which only time coherence is decreased and hence the laser light source apparatus can be reduced in size.

Since the laser light source apparatus has the configuration in which higher harmonic waves are spatially displaced with respect to two or more axes in the x-axis, the y-axis, and the z-axis directions, and superposed on each other, even when only a single amount of displacement is decreased, interference effect can sufficiently be decreased. When the amount of displacement is decreased, a shape of a beam profile can be prevented from being deformed, the effective diameter of the wavelength conversion element can be decreased, and hence the laser light source apparatus may not be affected by disturbance such as vibrations.

It should be noted that, when higher harmonic waves are spatially displaced based on the directions of two or more axes and superposed on each other as described above, it is possible to locate the retroreflection unit with a distance of time coherence length or less from the wavelength conversion element. As a result, it is possible to reduce the size of the retroreflection unit by decreasing a distance between the retroreflection unit and the wavelength conversion element, though depending on a shape of beam.

Moreover, when lateral multimode laser light is utilized as excited light from the excitation light source 1, if the retroreflected higher harmonic wave is displaced in the major-axis direction of the lateral multimode laser light, then it is possible to decrease interference visibility with a relatively small amount of displacement.

Further, although interference is intensified at the beam waist position when the concave mirror is used as the reflection unit provided within the resonator, if the amount of displacement of the retroreflection unit is adjusted, for example, the retroreflection unit is displaced in the two-axis directions or three-axis directions, interference can sufficiently be decreased.

Further, in the laser light source apparatus according to the embodiment of the present invention, if higher harmonic waves are displaced base on the directions of two axes or more, then since the amount of displacement can be decreased, higher harmonic waves can be retroreflected on an axis nearly equal to a higher harmonic wave generation axis. In this case, other optical parts for aligning optical axes may not be necessary, the configuration can be simplified and the number of parts can be reduced at its minimum, so that an inexpensive apparatus configuration can be obtained.

Further, it is possible to provide a highly-efficient laser light source apparatus with a small optical loss by decreasing the number of parts.

Next, an image generating apparatus according to an embodiment of the present invention using the above-mentioned image signal forming method will be described with reference to FIG. 20. This embodiment shows a case in which the laser light source apparatus of which output and beam profile are stabilized according to the embodiment of the present invention is applied to an illumination apparatus, and an image generating apparatus using an optical modulation device.

Figure 20:
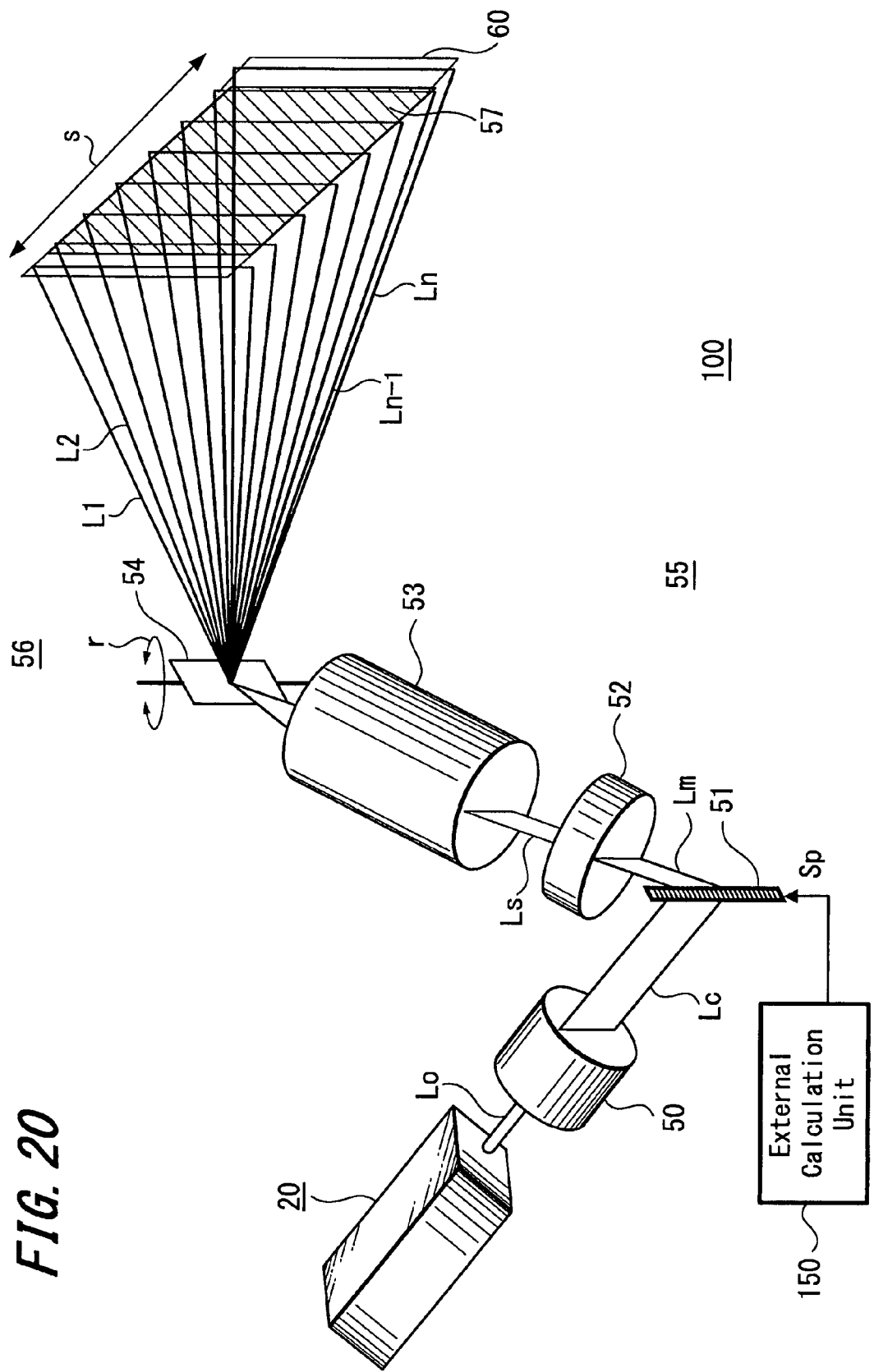
FIG. 20 is a schematic perspective view of an example of an image generating apparatus according to yet still another embodiment of the present invention.

As shown in FIG. 20, the image generating apparatus 100 includes the laser light source apparatus 20, an optical modulation unit 55 including an illumination optical system 50, one-dimensional optical modulation apparatus 51 of a diffraction grating type, for example, and an optical selection unit 52 and a scanning optical unit 56 including a projection optical unit 53 and a scanning device 54. The laser light source apparatus 20 can output lateral multimode one-dimensional higher harmonic waves, for example, similar to the aforementioned embodiments. One-dimensional optical modulation apparatus 51 having a diffraction grating type configuration, for example, may be irradiated with a laser light Lo emitted from the laser light source apparatus 20, and the laser beam bundle are reshaped by the illumination optical system 50 as one-dimensional (linear) light beam.

The diffraction grating type optical modulation apparatus 51 is operated in response to a signal Sp from a driving circuit, not shown, based on an image signal generated from an external calculation unit 150. When the optical modulation apparatus 51 is formed as the diffraction grating type, the diffracted light thereof is introduced into the light selection unit 52. When lights of three primary colors, for example, are used, laser beam bundles from light sources of respective colors are traveled through one-dimensional illumination apparatus and optical modulation apparatus of respective colors, superposed on each other by a color synthesizing unit such as an L-like prism and emitted to the light selection unit 52.

The light selection unit 52 includes an Offner relay optical system and a spatial filter (not shown) such as Schlieren filter. For example, + first-order light is selected by the light selection unit 52 and emitted as one-dimensional image light Lm. Further, the one-dimensional image light Lm is magnified by the projection optical unit 53 and scanned as shown by L1, L2, . . . , Ln−1, Ln as a scanning device 54 in the scanning optical unit 56 rotates as shown by an arrow r in FIG. 20, thereby resulting in a two-dimensional image 57 being generated on an image generation surface 60 such as a screen. Scanning positions are scanned on the image generation surface as shown by an arrow s in FIG. 20. As the scanning device, a so-called resonant scanner oscillated by an electromagnet may be used, for example, for scanning in addition to a galvano mirror and a polygon mirror.

As the optical modulation device, one-dimensional optical modulation device may be used such as a GLV® (Grating Light Valve type optical modulation device developed by Silicon Light Machines Corporation (U.S.A). Lateral multi-mode linear light, beam-shaped linear light or laser beams from parallel light sources are irradiated on this GLV device.

When beams are superposed on the retroreflected beam of the higher harmonic wave light, if interference effect is relatively large, then image quality obtained as the laser light source of the image generating apparatus 100 will have unstable image quality with time. The resultant image quality reflects a fluctuation of a light source output which changes in time due to interference effect. This instability is also observed in a case in which the retroreflection unit for retroreflecting higher harmonic waves is located distant from the wavelength conversion element with a distance longer than time coherence length.

On the other hand, when the laser light source apparatus having the above-mentioned configuration according to the embodiment of the present invention is used, an output and a beam profile can be stabilized so that image quality can be obtained with a small time fluctuation.

It should be noted that instability generated due to interference effect can be observed on the image generating screen in the state in which the retroreflection unit is located to superpose higher harmonic waves, the retroreflection unit can be fixed after the configuration position, the angle of the retroreflection unit are adjusted while a total amount of light noise with these lasers and image quality of the illumination are observed. Since the retroreflection unit is displaced in the axis directions of two or more axes so that the laser with small interference effect can be obtained, illumination image quality can be improved, a time fluctuation noise in the illumination image quality can be decreased to a level in which such time fluctuation noise may not be confirmed visually, and hence it may be possible to generate satisfactory images.

It should be noted that the image generating apparatus of the present invention is not limited to the above-mentioned example. In addition to the inventive configuration of the laser light source apparatus, the optical modulation unit, the projection optical unit, the scanning optical unit can be variously modified and changed. Also, the present invention is not limited to the projection type display and it can be applied to laser printers capable of generating character information and images by drawing.

Further, the present invention is not limited to the configurations described in the above-mentioned embodiments and the number of parts, materials, and configurations of the optical devices in the retroreflection unit within the resonator within the laser light source apparatus, for example, lenses for beam-shaping laser beam bundles can be variously modified and changed without departing from the configurations of the present invention. Higher harmonic waves generated in the wavelength conversion element are not limited to the second higher harmonic wave and may be higher harmonic waves than the third harmonic wave. Moreover, the present invention can be applied to a case in which higher harmonic waves are generated by mixing sum frequencies.

Further, the image generating apparatus of the present invention is not limited to the case in which the above-mentioned one-dimensional optical modulation apparatus is used and it can be applied to a case in which a two-dimensional type optical modulation apparatus such as a DMD (Digital Micro-mirror Device) and a resonance type scanning mirror is in use. It is needless to say that materials and configurations of an illumination optical system, an optical system, a projection optical system except a laser apparatus of a light source can be variously modified and changed without departing from the configurations of the present invention.

Furthermore, except the image generating apparatus, the present invention can be applied to at least one laser light source apparatus insofar as an optical apparatus utilizes one or more laser apparatus including a wavelength conversion element within a resonator.

It should be understood by those skilled in the art that various modifications, combinations, sub-combinations and alterations may occur depending on design requirements and other factors insofar as they are within the scope of the appended claims or the equivalents thereof.

What is claimed is:

1. A laser light source apparatus comprising:
   an excitation light source;
   a resonator including the excitation light source and a pair of resonator mirrors; wherein
   one of two higher harmonic waves generated from a wavelength conversion element is output to the outside of the resonator, and is returned to the wavelength conversion element by a retroreflection unit,
   the higher harmonic wave returned by the retroreflection unit is spatially displaced, and is superimposed on the other higher harmonic wave generated from the wavelength conversion element, and is output to the outside, wherein the one of the two higher harmonic waves generated from the wavelength conversion element is superimposed on the other higher harmonic wave such that an area of the beam with the one higher harmonic wave is displaced from that of the beam with the other higher harmonic wave in at least any one of x-axis, y-axis, and z-axis directions when the one of two higher harmonic waves generated from the wavelength conversion element is output to the outside of the resonator, is reflected by the retroreflection unit, and is returned to the wavelength conversion element where a y-axis represents a direction perpendicular to the surface of a substrate on which the resonant mirrors forming the resonator are mounted, a z-axis represents a direction extending along an optical axis of light introduced into the retroreflection unit, and an x-axis represents a direction perpendicular to the y-axis and z-axis.

2. A laser light source according to claim 1, wherein
a concave mirror is used in the higher harmonic wave retroreflection unit located at the outside of the resonator.

3. A laser light source according to claim 2, wherein
the one of two higher harmonic waves generated from the wavelength conversion element is superimposed on the other higher harmonic wave such that an area of the beam with the one higher harmonic wave emitted in one direction is displaced from that of the beam with the other higher harmonic wave emitted in the other direction when the one of two higher harmonic waves generated from the wavelength conversion element is output to the outside of the resonator, is reflected by the retroreflection unit, and is returned to the wavelength conversion element.

4. A laser light source apparatus comprising:
an excitation light source;
a resonator including the excitation light source and a pair of resonator mirrors; wherein
one of two higher harmonic waves generated from a wavelength conversion element is output to the outside of the resonator, and is returned to the wavelength conversion element by a retroreflection unit,
the higher harmonic wave returned by the retroreflection unit is spatially displaced, and is superimposed on the other higher harmonic wave generated from the wavelength conversion element, and is output to the outside further comprising
a driving unit for driving the retroreflection unit, wherein
the retroreflection unit can be displaced in at least one direction to rotate around and translate in the x-axis, to rotate around and translate in the y-axis direction, to rotate around and translate in the y-axis direction, to rotate around and translate in the z-axis, and to translate in the z-axis direction when a y-axis represents a direction perpendicular to the surface of a substrate on which the resonant mirrors forming the resonator are mounted, a z-axis represents a direction extending along an optical axis of light introduced into the retroreflection unit, and an x-axis represents a direction perpendicular to the y-axis and z-axis.

5. A laser light source apparatus according to claim 1, wherein
the retroreflection unit provided at the outside of the resonator is located at the position distant from the end face of the retroreflection unit of the wavelength conversion element having a distance of a time coherence length or more of the higher harmonic wave.

6. A laser light source according to claim 1, wherein
linear higher harmonic wave light by irradiating the wavelength conversion element with linear beams obtained by exciting the laser medium with a lateral multimode pattern from the light source.

7. An image generating apparatus comprising:
a laser light source apparatus; an optical modulating unit for modulating light emitted from the laser light source apparatus in response to information; and a projection optical unit,
the laser light source apparatus including an excitation light source;
a resonator including the excitation light source and a pair of resonator mirrors; wherein
one of two higher harmonic waves generated from the wavelength conversion element is output to the outside of the resonator, is returned to the wavelength conversion element by a retroreflection unit,
the higher harmonic wave returned by the retroreflection unit is spatially displaced, is superimposed on the other higher harmonic wave generated from the wavelength conversion element, and is output to the outside, wherein the one of the two higher harmonic waves generated from the wavelength conversion element is superimposed on the other higher harmonic wave such that an area of the beam with the one higher harmonic wave is displaced from that of the beam with the other higher harmonic wave in at least any one of x-axis, y-axis, and z-axis directions when the one of two higher harmonic waves generated from the wavelength conversion element is output to the outside of the resonator, is reflected by the retroreflection unit, and is returned to the wavelength conversion element where a y-axis represents a direction perpendicular to the surface of a substrate on which the resonant mirrors forming the resonator are mounted, a z-axis represents a direction extending along an optical axis of light introduced into the retroreflection unit, and an x-axis represents a direction perpendicular to the y-axis and z-axis.

* * * * *